A. CECKA.
AUTOMOBILE FENDER.
APPLICATION FILED OCT. 13, 1920.
1,378,322.
Patented May 17, 1921.
2 SHEETS—SHEET 1.
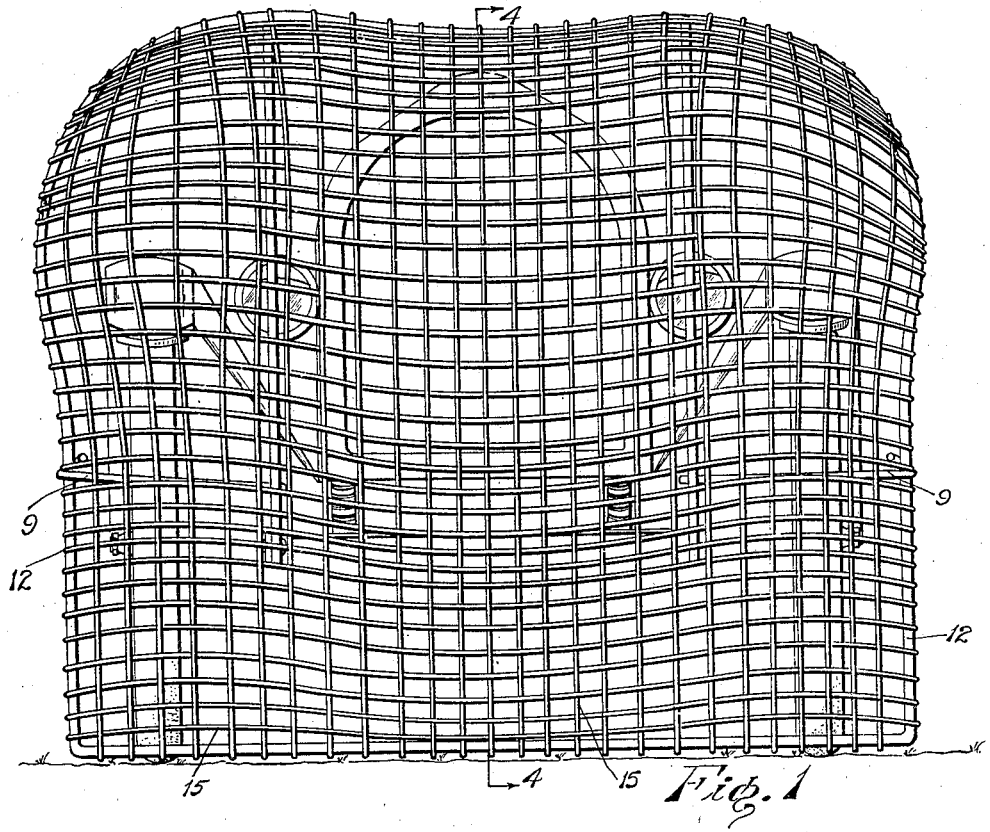
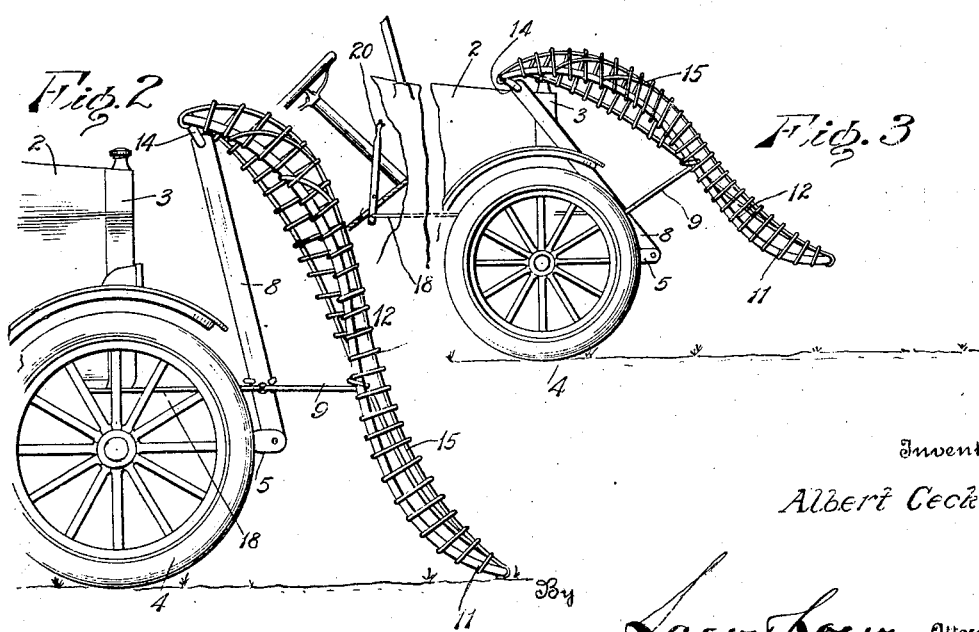
Inventor
Albert Cecka

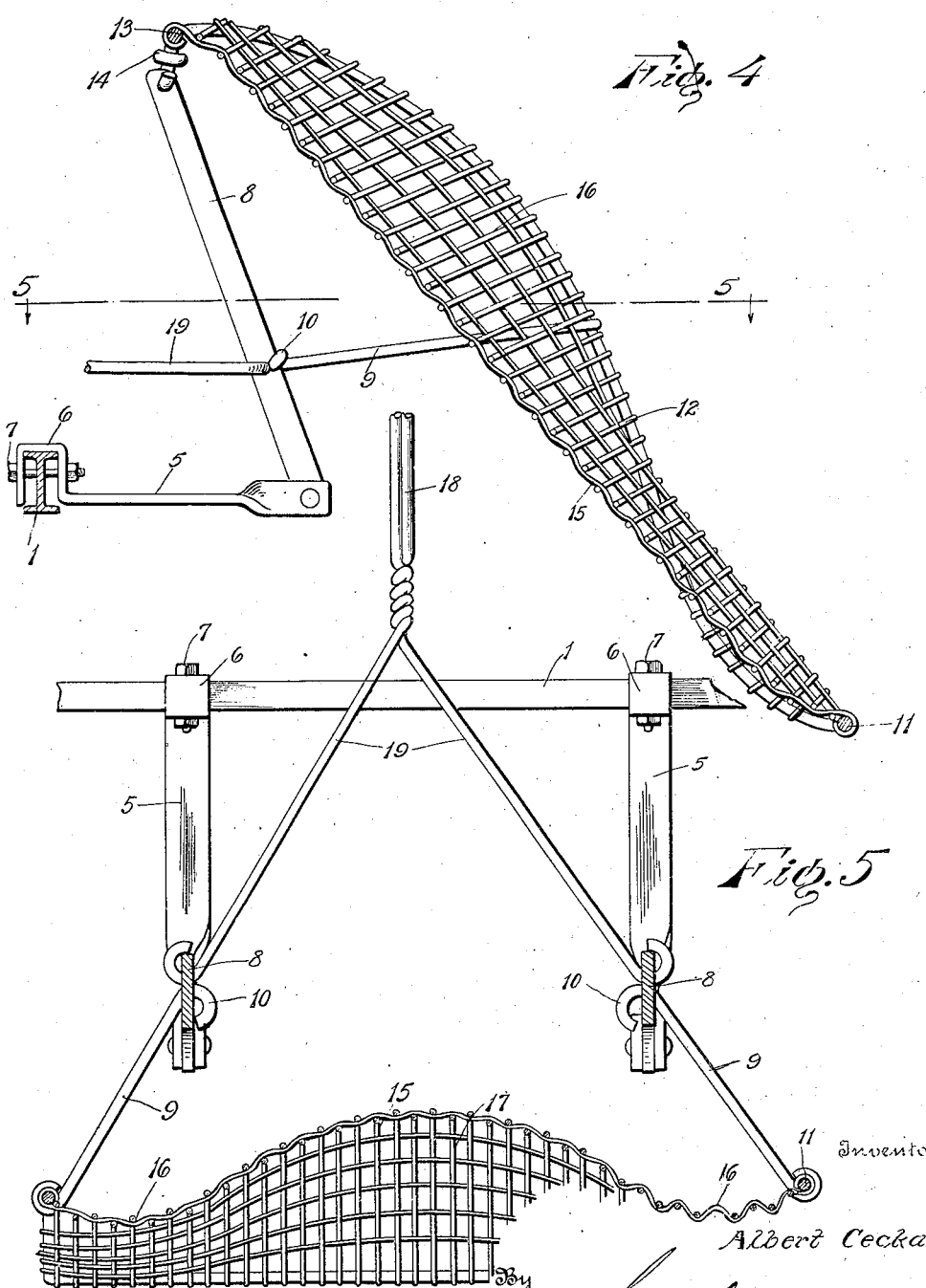

UNITED STATES PATENT OFFICE.

ALBERT CECKA, OF MINNEAPOLIS, MINNESOTA.

AUTOMOBILE-FENDER.

1,378,322.   Specification of Letters Patent.   Patented May 17, 1921.

Application filed October 13, 1920. Serial No. 416,715.

*To all whom it may concern:*

Be it known that I, ALBERT CECKA, a citizen of the United States, residing at Minneapolis, in the county of Hennepin and State of Minnesota, have invented certain new and useful Improvements in Automobile-Fenders, of which the following is a specification.

This invention is a fender for automobiles and has for its object the provision of a device which will be inexpensive and easily shifted from inoperative to operate position. The invention also has for its object the provision of a fender which will prevent any part of the front end of an automobile striking a person who may be in the path of the vehicle and which will be of such a construction that a person who may stray into the path of an approaching vehicle will be taken up by the fender and supported without injury until the vehicle can be stopped. The invention is illustrated in the accompanying drawings and consists in certain novel features which will be hereinafter fully described and then particularly pointed out in the claims.

In the drawings—

Figure 1 is a front elevation of my improved fender;

Fig. 2 is a side elevation of a portion of an automobile showing the fender in operative position;

Fig. 3 is a similar view showing the fender in normal or inoperative position;

Fig. 4 is a vertical section on the line 4—4 of Fig. 1;

Fig. 5 is a horizontal section on the line 5—5 of Fig. 4.

The automobile may be of any preferred or well known type and the fender is to be supported from the front axle 1 in such position that it will extend above and cover the entire front end of the vehicle including the hood 2 and radiator 3 as well as the wheels 4. In carrying out the invention, I employ a pair of supporting arms 5 which are secured rigidly to the axle 1 at opposite sides of the center thereof and project forwardly, as clearly shown. These arms may be of any material having the necessary strength and will preferably be constructed of metal and have stirrups or forks 6 at their rear ends adapted to fit over the axle and be rigidly secured thereto by bolts 7 inserted through the axle and the vertical side members of the yokes, as clearly shown and as will be readily understood. To the front ends of the said supporting arms 5, I pivotally secure levers 8 which extend upwardly from the supporting arms and normally project rearwardly at the sides of the radiator and hood, as shown in Fig. 3. To the said levers, at points intermediate their ends, I secure braces 9 which extend forwardly and laterally from the levers and have their outer extremities engaged with the frame of the fender. These braces may conveniently be stout rods having hooks 10 at their inner ends to engage through openings in the levers and such construction will be cheap and permit a rapid assembling of the parts, while at the same time it will possess sufficient strength to provide an efficient device. The frame of the fender consists of a rod of circular cross section, shown at 11, and bent to form a continuous open frame having a lower straight horizontal portion and side portions 12 rising from the said lower portion, the said side portions being given an ogee form so that they curve rearwardly and upwardly from the ends of the lower end portion, as shown clearly in Figs. 2 and 3, and then extend forwardly in their upper portions and finally rearwardly and inwardly so as to merge into an upper transverse portion 13 to which the upper ends of the levers 8 are connected by coupling links 14 of any convenient type. Between the upper ends of the levers 8, the frame is slightly dipped, as shown clearly in Fig. 1. The frame is covered with a net-like structure consisting of vertical and horizontal wires 15 which may be woven in any desired manner and present a net-like cover for the frame which will extend over the entire front end of the vehicle and which will support a person without injury. The ogee formation of the sides of the frame will cause the cover member or body of the fender to project forwardly at its upper side edges so that a person taken up by the fender will naturally turn or roll to the center of the same and this shape or adaptability of the fender body may be increased by having the wires 15 of such gage that they may be bent into a desired form and will then tend to retain that form. Referring particularly to Figs. 4 and 5, the forwardly projecting upper side portions of the fender body are designated by the numeral 16 and the intermediate depressed or basket-like receptacle is designated by the numeral 17.

An operating rod 18 is mounted in any convenient manner upon the bottom of the automobile body so that it may slide longitudinally readily when desired. The front end of this operating rod is forked or equipped with diverging arms 19 which are pivotally engaged with the levers 8 so that when the operating rod is shifted longitudinally the said levers will be rocked about their pivotal connections with the arms 5 and the fender shifted so that it will be supported above the ground in an inoperative position and thereby held out of the way of stones or other obstructions or it may be lowered so that its lower edge will rest upon the ground and a person exposed to injury taken up by the fender. To shift the operating rod, a hand lever 20 is provided at any convenient point within the body of the vehicle and pivotally attached to the rear end of the rod.

Normally, the fender will be supported in the position shown in Fig. 3, so that it will not interfere in any way with the progress of the vehicle. Should a person suddenly appear in front of the vehicle or a person who may be in the path of the vehicle fail to heed the warning signals given by the chauffeur, the hand lever 20 will be rocked so that the levers 8 will be swung forward to the position shown in Fig. 2, whereupon the fender will be lowered so that the person in danger will be taken up by the fender and not struck by the automobile. The device is exceedingly simple in its construction and may be applied to any automobile at a very low cost. It is of such form that it will possess the desired degree of efficiency without being so heavy as to add appreciably to the deadweight of the vehicle and it may be easily and quickly shifted from inoperative to operative position or vice versa.

Having thus described the invention, what is claimed as new is:

1. A fender for automobiles comprising a pair of supporting arms to be secured to the automobile axle, levers pivoted at their lower ends to the front ends of said arms and rising therefrom, an open frame carried by the upper ends of said levers and extending downwardly and forwardly therefrom, a body secured upon and covering said frame, and means for shifting the said levers connected therewith intermediate their ends and extending rearwardly therefrom.

2. A fender for automobiles comprising a pair of supporting arms to be secured to the front axle of the automobile, horizontally spaced levers pivoted at their lower ends to and rising from the front ends of said arms, braces extending forwardly and laterally from said levers, an open frame having its side members attached to the front ends of said braces and having its top member connected to the upper ends of said levers, a body secured to and extending over the said frame, an operating rod slidably mounted upon the automobile, and diverging arms connecting the front end of said operating rod with the levers.

In testimony whereof I affix my signature.

ALBERT CECKA. [L. S.]